May 1, 1962 G. W. SCHULZ 3,032,049
COMPOUND GOVERNOR

Filed May 11, 1959 2 Sheets-Sheet 1

OUTPUT SHAFT RPM X 10⁻²

GEORGE W. SCHULZ
INVENTOR.

BY John R. Faulkner
Donald J. Harrington

ATTORNEYS

GEORGE W. SCHULZ
INVENTOR.

United States Patent Office 3,032,049
Patented May 1, 1962

3,032,049
COMPOUND GOVERNOR
George W. Schulz, Detroit, Mich., assignor to Ford Motor Company, Dearborn, Mich., a corporation of Delaware
Filed May 11, 1959, Ser. No. 812,186
12 Claims. (Cl. 137—56)

My invention relates generally to fluid pressure control mechanisms and more particularly to a fluid pressure modulating valve assembly capable of establishing a pressure signal proportional in magnitude to the speed of rotation of a rotary member to which the valve assembly is connected.

The structure of my invention is capable of functioning as a fluid pressure governor for use with an automatic power transmission mechanism, and the pressure signal established by the governor may be utilized by the automatic power transmission control circuit for the purpose of establishing the various automatic control functions.

According to one feature of my invention, I have provided a governor comprising a fluid pressure modulating valve disposed within a valve housing carried by a rotary transmission tailshaft and the valve is subjected to centrifugal force due to the mass of the movable portions of the valve assembly and the rotation of the tailshaft. The centrifugal force is opposed and balanced during normal operation by a variable fluid pressure force established by the governor, the pressure force acting on a differential area on the valve.

The centrifugal force which opposes the fluid pressure force is produced by means of a compound weight system and the valve assembly is characterized by a high degree of sensitivity to changes in speed when the speed is of low magnitude and by a lesser degree of sensitivity to changes in speed when the speed is relatively high. This is accomplished in my instant invention by causing one portion of the valve actuating mass of the compound weight system to be grounded against the relatively fixed valve housing when the speed of rotation is high and by interconnecting the individual portions of the weight system for conjoint centrifugal action when the speed is relatively low. The transition from one operating range to the other which occurs when one portion of the weight system is grounded is characterized by a sharp break point in the pressure—speed relationship.

According to a further object of my invention, the centrifugal force acting on the compound weight system above described is supplemented by a pressure force established by the pressure signal produced by the governor mechanism. This so-called pressure feedback feature reduces the size and mass which would ordinarily be required to establish the valve actuating forces necessary to produce a pressure—speed relationship of relatively steep slope in the low speed range.

The provision of a governor mechanism of the type above described being a principal object of my invention, it is a further object of my invention to provide means for establishing a governor speed signal with a minimum amount of space being required.

It is a further object of my invention to provide a governor mechanism of the type set forth wherein the pressure—speed relationship is characterized by a steep slope in the lower speed range and by a reduced slope in the higher speed range. This is accomplished in my instant invention by providing a centrifugally operated pressure modulating valve wherein fluid pressure biasing forces are utilized to oppose and balance the centrifugal forces acting on the valve. The changes in the pressure modulating characteristics of the valve are accomplished by changing the effective area on which the pressure signal is caused to act, the effective area at low speeds being substantially less than the effective area at high speeds.

It is a further object of my invention to provide a governor mechanism wherein a transition is obtained in the operating characteristics when the operating speed changes from a lower speed range to a higher speed range and wherein the transition is accomplished by the combined influence of the above-described change in the effective area on which the governor pressure acts and from the change resulting from the grounding of one portion of the above-described compound weight system.

It is a further object of my invention to provide a governor mechanism which is capable of being incorporated in a variety of control circuits of known construction with a minimum amount of alteration being required.

It is a further object of my invention to provide a multiple stage fluid pressure governor capable of being used with an automatic power transmission circuit wherein the governing function is distributed throughout a relatively wide speed range and wherein the magnitude of the pressure signal established at lower speeds is relatively high. This feature is of importance in an automatic power transmission control circuit since the automatic pressure distributing valves function in response to governor pressure, and the controlled response of these valves is more precise and positive when the valve actuating governor pressure forces are of higher order.

It is a further object of my invention to provide a governor mechanism which is of simplified construction and which may be manufactured and assembled by known mass production techniques.

Further features, objects and advantages of my invention will become apparent from the drawings and from the following description.

For the purpose of more particularly describing my instant invention, reference will be made to the accompanying drawings wherein.

Figure 1:
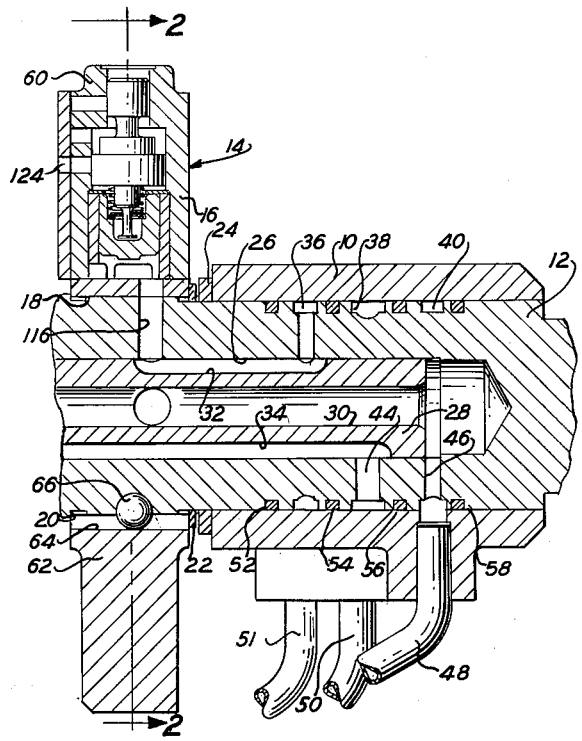
FIGURE 1 is a cross sectional view of my improved governor assembly mounted on a transmission tailshaft for a typical automatic power transmission. The plane of the section of FIGURE 1 contains longitudinal axes of the transmission tailshaft.

Referring first to FIGURE 1, I have illustrated a portion of a transmission tailshaft assembly for an automatic power transmission mechanism of known construction. The transmission includes a casing which defines a sleeve 10 through which a tailshaft 12 extends. The governor mechanism of my instant invention is generally identified by numeral 14 and it is carried by the tailshaft 12 at a location adjacent sleeve 10.

The governor mechanism includes a casting 16 within which is formed an opening 18 through which tailshaft 12 extends. Shaft 12 is formed with a peripheral shoulder 20 engageable with casting 16 for axially positioning the same. A snap ring 22 is received in a snap ring groove situated adjacent casting 16 and a suitable spacer 24 is disposed around shaft 12 between snap ring 22 and the adjacent side of sleeve 10.

Shaft 12 is formed with an axially extending bore or opening 26 within which is positioned a pressure distributor 28 having a central opening 30 and longitudinally extending grooves 32 and 34.

Shaft 12 is formed with three peripheral grooves identified by numerals 36, 38 and 40 and radial passages 42, 44 and 46, respectively, communicate with grooves 36, 38 and 40. Passage 46 provides communication between groove 40 and opening 30. Similarly, passage 44 provides communication between peripheral groove 38 and longitudinal groove 34, and passage 42 provides communication between peripheral groove 36 and longitudinal groove 32. Control pressure is supplied to passage 46 by means of control pressure conduit 48 which is received in a suitable opening formed in sleeve 10. Similarly, another clutch pressure conduit 50 communicates with groove 38 and passage 44 through an opening formed in sleeve 10. A governor pressure passage 42 communicates with peripheral groove 36 and with longitudinal groove 26. A governor pressure conduit 51 communicates with passage 42 and extends to the transmission controls. Suitable sealing rings are provided as indicated at 52, 54, 56 and 58 to prevent short-circuiting of fluid pressure from one peripheral groove to another.

Casting 16 is formed in two parts, each part being situated on opposite sides of the axis of rotation of shaft 12. These parts are separately identified by numerals 60 and 62, the part 60 defining a valve body and the part 62 defining a centrifugal counterbalance weight which opposes and balances the centrifugal force established by valve body part 60, the cooperating valve components and the fluid in the associated fluid passages. The opening 18 is formed with a longitudinal groove 64 within which is received a ball 66, the latter acting as a key for locking the valve body to shaft 12.

Figure 2:
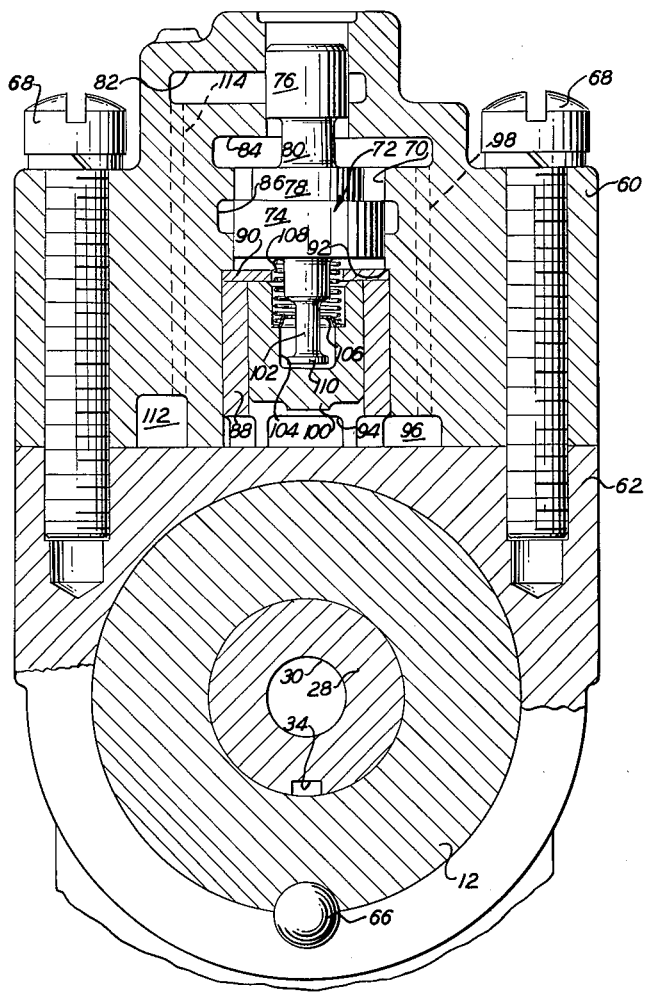
FIGURE 2 is a partial, transverse cross sectional view of the governor assembly shown in FIGURE 1 and is taken along section line 2—2 of FIGURE 1.

As best seen in FIGURE 2, valve body part 60 is secured to part 62 by a pair of spaced bolts 68. Valve body part 60 is formed with a radially disposed valve opening 70 within which a multiple diameter valve spool 72 is slidably positioned. Valve spool 72 is formed with a first valve land 74 and a second valve land 76, the diameter of the latter being substantially less than the diameter of the former. Valve land 76 is slidably positioned in the reduced diameter portion of valve opening 70. The radially outward portion of valve opening 70 is opened and it communicates with the exhaust region of the transmission mechanism. Valve spool 72 is formed with reduced diameter portions 78 and 80 intermediate valve lands 74 and 76.

A line pressure passage in the form of a transverse groove is shown at 82 and a governor pressure passage in the form of another transverse groove is shown at 84. Groove 82 communicates with the reduced diameter portion of valve opening 70 and valve land 76 is adapted to cooperate therewith thereby controlling the degree of communication between valve opening 70 and groove 82. An exhaust groove 86 also communicates with valve opening 70 and communication between groove 86 and opening 70 is adapted to be controlled by valve land 74 which cooperates with groove 86.

The radially inward region of valve opening 70 has received therein a sleeve 88 and a washer 90 is situated at one end thereof in engagement with a peripheral shoulder 92 formed on the interior of valve opening 70. The radially inward end of sleeve 88 is recessed as shown at 94 to permit communication between the interior of sleeve 88 and a governor pressure port 96, the latter communicating with groove 84 through a passage 98 formed in valve body part 60.

A piston plug or plunger 100 is slidably positioned in sleeve 88 and it is adapted to engage washer 90 when it assumes a limiting radial position as indicated in FIGURE 2. Valve spool 72 is formed with a stem 102 of reduced diameter which is received within an internal opening 104 formed in plug 100. Opening 104 is formed with a peripheral shoulder on which a spring seat 106 is positioned. A compression spring 108 of relatively low rate is disposed between valve land 74 of valve element 72 and spring seat 106, and it surrounds stem 102 as indicated in FIGURE 2.

The inner end of stem 102 is formed with a shoulder 110 which limits the radial movement of spring seat 106 under the influence of spring 108 and permits a certain degree of preloading of spring 108 during assembly. It is apparent from the above description that spring 108 is adapted to normally urge plug 100 away from valve spool 72.

Groove 82 is in communication with a line pressure port 112 through an internal passage 114 formed in valve body part 60. Port 112 communicates with the aforementioned cylindrical opening 30 and line pressure conduit 48 through an internal radial passage, not illustrated, formed in shaft 12. Similarly, governor pressure port 96 communicates with the aforementioned longitudinal groove 32 through a radial passage 116 formed in shaft 12 as best seen in FIGURE 1.

Figure 3:
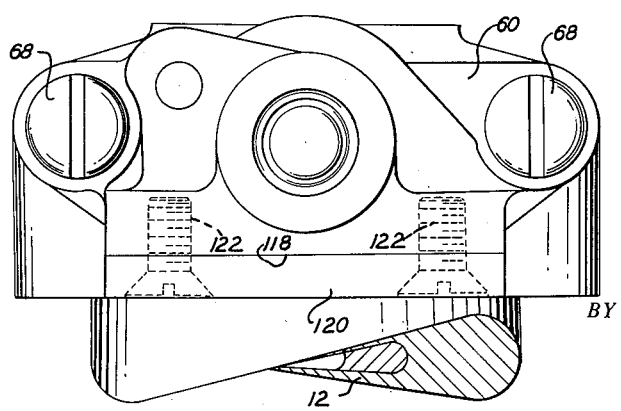
FIGURE 3 is a plan view of the governor valve assembly of FIGURES 1 and 2.

As best seen in FIGURE 3, the side of the valve body part 60 is machined with a flat surface 118 and grooves 82, 84 and 86 extend to surface 118. This facilitates formation of these grooves by normal die casting methods. A cover plate 120 is secured to surface 118 by screws 122. An opening 124 is formed in plate 120 as shown in FIGURE 1 to allow fluid to exhaust from groove 86 to the exterior of the valve body.

During operation of the governor mechanism above described, the casting 16 rotates about the axis of tailshaft 12 when the vehicle is in motion. As soon as rotary motion is imparted to the assembly, plug 100 will be urged radially outward under the influence of centrifugal force against spring seat 106. The combined mass of the plug 100 and the mass of valve spool 72 causes valve spool 72 to be urged in a radially outward direction under the influence of centrifugal force thereby establishing communication between line pressure groove 82 and governor pressure groove 84. Valve land 76 functions to regulate the degree of communication between the two grooves and radially outward displacement of valve spool 72 is accompanied by an increase in the degree of communication between grooves 82 and 84. Valve land 74 controls the degree of communication between exhaust groove 86 and governor pressure groove 84 and radially outward displacement of valve spool 72 is accompanied by a decrease in the degree of communication between these two grooves. It is thus apparent that the tendency of the valve spool 72 to move radially outward during rotation of shaft 12 is accompanied by a progressive decrease in communication between grooves 86 and 84 and by a progressive increase in the degree of communication between grooves 82 and 84. The pressure which exists in groove 84 is therefore functionally related to the speed of rotation of shaft 12. The radially outward part of valve land 76 functions as a fluid seal for the exhaust opening at the outward end of valve opening 70.

The pressure in groove 84 is distributed through passage 98, passage 116 in shaft 12, longitudinal groove 32, radial passage 42 in shaft 12 and governor pressure conduit 51. Conduit 51 in turn extends to the automatic control circuit where the governor pressure is utilized to establish control functions in known fashion.

The governor pressure in groove 84 acts on the effective differential area on valve spool 72 between lands 74 and 76 thereby establishing an inwardly directed radial force which opposes and balances the outwardly directed valve actuating forces. Governor pressure port 96 also communicates with the radially inward side of plug 100 and a governor pressure force is thereby established which acts on plug 100 in a radially outward direction to supplement the centrifugal forces previously mentioned. It is therefore apparent that the net area on which the governor pressure acts is equal to the difference between the differential area between lands 74 and 76 and the area of plug 100.

After the speed of rotation of shaft 12 reaches a predetermined value, the spring will yield sufficiently to cause plug 100 to be grounded against washer 90 and valve housing part 60. The centrifugal force acting on valve plug 100 at any tailshaft speed in excess of this predetermined value will have no influence on the governing characteristics of valve spool 72 and the only forces acting on valve spool 72 at such high tailshaft speeds are the centrifugal force due to the mass of the valve the spring force of spring 108 and the governor pressure force acting on the differential area between valve lands 74 and 76.

Governor pressure is distributed to the radially inward region of the governor assembly through passage 98 and the surface of the radially inward side of the plug 100 establishes an outwardly directed fluid pressure force which supplements the force acting on plug 100. The combined influence of centrifugal force and governor pressure acting on plug 100 is transferred to valve spool 72 through spring 108. When the valve spool 72 is subjected to the forces above described, the magnitude of governor pressure which is established for any driven speed of the shaft 12 may be represented by the lower portion of the full line curve shown in FIGURE 4. This portion of the curve has a rather steep slope by reason of the operation of the compound weight system.

Figure 4:
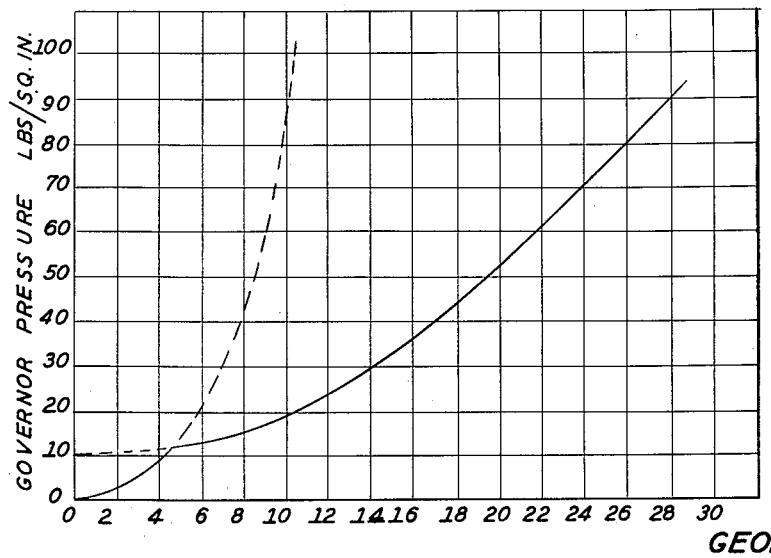
FIGURE 4 is a graphic representation of the pressure—speed relationship which is characteristic of the governor mechanism of my instant invention.

When the speed of rotation of shaft 12 reaches a precalibrated value (for example, 320 r.p.m.), the combined influence of the centrifugal force and the pressure force acting on plug 100 is sufficient to cause spring 108 to yield, the preload of spring 108 being equal to the outwardly directed forces on plug 100 during this operating stage. Upon a further increase in the speed of rotation, plug 100 will bottom against washer 90 and further outward movement of plug 100 will be prevented. It is thus apparent that further increases in the centrifugal force and the pressure force acting on plug 100 will have no influence on the modulating characteristics of valve spool 72 and the variation in governor pressure with the changes in speed of shaft 12 after this predetermined speed is obtained is represented in the graph of FIGURE 4 by the upper portion of the full line curve. The transition from the lower portion of the curve to the upper portion of the curve is characterized by a break point as indicated.

The effective area on the valve assembly on which the governor pressure is caused to act is changed from a first designed value to a lesser value when the plug 100 becomes bottomed or anchored against the valve body as above described. It is this change in area which is partly responsible for the above-mentioned break point or change in slope of the pressure—speed relationship. Concurrently with this increase in the effective area on which the governor pressure acts, the effective mass of the pressure regulating forces of the assembly is abruptly reduced when plug 100 is anchored against the valve body. This characteristic is also partly responsible for the above-mentioned break point.

When the speed of rotation of the shaft 12 increases to values greater than the value at which the break point occurs, the centrifugal force acting on the valve spool 72 will continue to be opposed by the governor pressure acting on the differential area defined by lands 76 and 74. This centrifugal effect tends to move the valve spool 72 radially outward thereby tending to further increase the degree of communication between grooves 82 and 84 and to simultaneously decrease the degree of communication in groove 84 and exhaust groove 86. During this operating stage the force of spring 108 continues to act on valve spool 72.

The upper portion of valve land 76 provides an effective fluid seal between line pressure passage 82 and the exhaust port at the outward extremity of the valve body. By preference, the spring 108 is characterized by a rather low rate and it is precompressed. This precompression is made possible by reason of the spring seat 106 carried by stem 102. In this way the spring force acting on valve spool 72 at speeds greater than the speed at which the break point occurs will be substantially constant regardless of the radial displacement of valve spool 72 at operating speeds greater than that at which the break point occurs. A limited amount of such radial displacement is necessary because of the overlap which is required in the valve lands 74 and 76 relative to the cooperating grooves 82 and 86.

In one operating environment the spring rate of spring 108 is approximately five pounds/inch and the magnitude of the line pressure supplied to groove 82 is about 100 p.s.i. Also, the movement of the plug 100 is approximately ³⁄₃₂ of an inch and the amount of free travel of plug 100 is about .030 inch. Also, the effective differential area on which governor pressure is caused to act is about .03 square inch and the break point occurs at approximately 400 r.p.m. After the break point occurs the effective area is increased to about .2 square inch.

Since it is desirable to form the spring 108 with a low rate, the speed at which spring 108 begins to yield will be rather close to the speed at which the plug 100 will seat.

The structural characteristics above mentioned, the mass of the plug 100 and valve spool 72 and the structural characteristics of the same may be varied as desired depending upon the governing characteristics which are required.

Having thus described a preferred embodiment of my invention, what I claim and desire to secure by U.S. Letters Patent is:

1. In a governor mechanism for establishing a fluid pressure signal which is functionally related in magnitude to the speed of rotation of a rotary member, a governor valve body connected to said rotary member, a valve chamber formed in said valve body, a pressure supply passage and a governor pressure passage formed in part in said valve body and communicating with said valve chamber, a valve element mounted in said valve chamber, said valve element being adapted to move radially outward from the axis of rotation of said rotary member under the influence of centrifugal force and to control the degree of communication between said pressure supply passage and said governor pressure passage, said valve element having valve lands of differential dimensions formed thereon defining a fluid pressure area, the governor pressure being caused to act on said area to produce a pressure force for balancing said centrifugal force, a centrifugal weight movably mounted in said valve body and adapted to move in a radially outward direction under the influence of centrifugal force, resilient means for transferring the centrifugal force acting on said weight to said valve, abutment means formed in part on said valve body for anchoring said weight to said valve body after a predetermined radial displacement of said weight, and passage means for conducting modulated pressure from said governor pressure passage to the radially inward region of said valve body for subjecting said weight to a radial fluid pressure force which supplements the centrifugal force acting on said weight.

2. In a governor mechanism for establishing a fluid pressure signal functionally related in magnitude to the speed of rotation of a rotary member, a governor valve body connected to said rotary member, a pressure supply passage and a governor pressure passage defined in part by said valve body, valve means including a movable valve element disposed within said valve body for providing a controlled degree of communication between said passages and for establishing a modulated pressure in said governor pressure passage, a portion of said valve element being subjected to said modulated pressure, the centrifugal force acting on said valve element opposing the pressure force established by said modulated pressure, a centrifugal weight carried by said valve body, said weight being movable outwardly relative to the axis of rotation of said rotary member under the influence of centrifugal force, resilient means for transferring the centrifugal force of said weight to said valve element, means for anchoring said weight to said valve body when a predetermined speed of rotation of said valve body is obtained, and passage means for conducting modulated pressure from said governor pressure passage to a radially inward region of said mechanism and for subjecting said weight to an outwardly directed pressure force.

3. In a governor mechanism for establishing a fluid pressure signal functionally related in magnitude to the speed of rotation of a rotary member, a governor valve body connected to said rotary member, pressure modulating means disposed in said valve body, a pressure supply passage and a governor pressure passage formed in part in said valve body, said modulating means providing a controlled degree of communication between said passages whereby a modulating pressure is established in said governor pressure passage, said modulating means being subjected to centrifugal forces when said rotary member is rotated, said modulating means including two relatively movable portions, each portion being formed with fluid pressure areas on which said modulated pressure is caused to act, the fluid pressure force acting on one portion being opposed to the fluid pressure force acting on the other portion, and means for anchoring said other portion against said valve body when the forces acting on said other portion reach a predetermined value.

4. In a governor mechanism for establishing a fluid pressure signal functionally related in magnitude to the speed of rotation of a rotary member, a valve body connected to said rotary member, pressure modulating means for establishing a modulated pressure disposed in said valve body, a pressure supply passage and a governor pressure passage formed in part in said valve body and communicating with said modulating means, said modulating means being characterized by opposed fluid pressure areas, each of which is adapted to be subjected to said modulated pressure, said modulating means being subjected to and actuated by centrifugal force when said rotary member is rotated, the effective fluid pressure force and the effective centrifugal force acting on said modulating means being opposed to each other, and means for anchoring a portion of said modulating means against said valve body when the speed of rotation of said rotary member exceeds a predetermined value, one of said fluid pressure areas being located on said portion of said modulating means.

5. In a governor mechanism for establishing a fluid pressure signal functionally related in magnitude to the speed of rotation of a rotary member, a valve body connected to said rotary member, pressure modulating means for establishing a modulated pressure comprising independently movable portions disposed in said valve body, a pressure supply passage and a governor pressure passage formed in part in said valve body and communicating with said modulating means, each portion of said modulating means being characterized by a separate fluid pressure area adapted to be subjected to said modulated pressure, each of said portions being subjected to and actuated by centrifugal force when said rotary member is rotated, the effective fluid pressure force and the effective centrifugal force acting on said modulating means being opposed to each other, and means for anchoring one of said portions of said modulating means against said valve body when the speed of rotation of said rotary member exceeds a predetermined value.

6. In a governor mechanism for establishing a fluid pressure signal functionally related in magnitude to the speed of rotation of a rotary member, a valve body connected to said rotary member, pressure modulating means for establishing a modulated pressure comprising independently movable portions disposed in said valve body, a pressure supply passage and a governor pressure passage formed in part in said valve body and communicating with said modulating means, each portion of said modulating means being characterized by a separate fluid pressure area adapted to be subjected to said modulated pressure, each of said portions being subjected to and actuated by centrifugal force when said rotary member is rotated, the effective fluid pressure force and the effective centrifugal force acting on said modulating means being opposed to each other, means for resiliently connecting the independently movable portions of said modulating means whereby the pressure and centrifugal forces acting on one portion are transferred to the other portion during rotation of said rotary member at speeds less than a predetermined value, and means for overruling the influence of the changes in the modulated pressure force and centrifugal pressure force acting on said one portion when the speed of rotation of said rotary member exceeds said predetermined value.

7. In a governor mechanism for establishing a fluid pressure signal functionally related in magnitude to the speed of rotation of a rotary member, a valve body connected to said rotary member, pressure modulating means for establishing a modulated pressure comprising a movable valve element disposed in said valve body, said valve element being subjected to centrifugal force during operation and being sensitive to changes in the magnitude thereof, a pressure supply passage and a governor passage formed in part in said valve body and communicating with said modulating means, a centrifugal weight mounted in said valve body and adapted for movement in a direction transverse to the axis of rotation of said rotary member under the influence of centrifugal force, said valve and said weight each having a fluid pressure area adapted to be subjected to said modulated pressure thereby establishing opposed fluid pressure forces, means for resiliently connecting said valve and said weight whereby the pressure force and centrifugal force acting on said weight are transferred to said valve during rotation of said rotary member at speeds less than a predetermined value, and means for overruling the influence of changes in the modulated pressure force and centrifugal force acting on said weight when the speed of rotation of said rotary member exceeds said predetermined value, said last-named means comprising an abutment connected to said valve body and situated in the line of motion of said weight, said weight being engageable with said abutment during operation at speeds greater than said predetermined value.

8. In a governor mechanism for establishing a fluid pressure signal functionally related in magnitude to the speed of rotation of a rotary member, a valve body connected to said rotary member, pressure modulating means for establishing a modulated pressure comprising a movable spool valve element disposed in said valve body, a pressure supply passage and a governor pressure passage formed in part in said valve body and communicating with said modulating means, said valve element having spaced valve lands thereon of differential diameter providing a controlled degree of communication between said governor pressure passage and said pressure supply passage, the differential area defined by said valve lands being subjected to said modulated pressure whereby a radially inward pressure force is established which opposes the outwardly directed centrifugal force acting on said spool valve element, a centrifugal weight movably mounted in said valve body, resilient means interconnecting said weight and said valve element, internal passage means formed in said valve body for subjecting said weight to said modulated pressure thereby establishing a radially outward fluid pressure force to supplement a centrifugal force acting on said weight, and means for overruling the influence of changes in the modulated pressure force and centrifugal force acting on said weight when the speed of rotation acting on said rotary member exceeds said predetermined value.

9. In a governor mechanism for establishing a fluid pressure signal functionally related in magnitude to the speed of rotation of a rotary member, a valve body connected to said rotary member, pressure modulating means for establishing a modulated pressure comprising a movable spool valve element disposed in said valve body, a pressure supply passage and an exhaust port formed in said valve body and communicating with said modulating means, said valve element having spaced valve lands formed thereon of differential diameter, a governor pressure passage communicating with said modulating means at a location intermediate said valve lands, one valve land providing a controlled degree of communication between said pressure supply passage and said governor pressure passage and the other valve land providing a controlled degree of communication between said exhaust port and said governor pressure passage, said governor pressure passage being located intermediate said exhaust port and said pressure supply passage, the differential area defined by said valve lands being subjected to said modulated pressure whereby a radially inward pressure force is established which opposes the outwardly directed centrifugal force acting on said spool valve element, a centrifugal weight movably mounted in said valve body, resilient means interconnecting said weight and said valve element, internal passage means formed in said valve body for subjecting said weight to said modulated pressure thereby establishing a radially outward fluid pressure force to supplement the centrifugal force acting on said weight, and means for overruling the influence of changes in the modulated pressure force and centrifugal force acting on said weight when the speed of rotation acting on said rotary member exceeds said predetermined value.

10. In a governor mechanism for establishing a fluid pressure signal functionally related in magnitude to the speed of rotation of a rotary member, a valve body connected to said rotary member, pressure modulating means for establishing a modulated pressure comprising a movable spool valve element disposed in said valve body, a pressure supply passage and an exhaust port formed in said valve body and communicating with said modulating means, said valve element having spaced valve lands formed thereon of differential diameter, a governor pressure passage communicating with said modulating means at a location intermediate said valve lands, one valve land providing a controlled degree of communication between said pressure supply passage and said governor pressure passage and the other valve land providing a controlled degree of communication between said exhaust port and said governor pressure passage, said governor pressure passage being located intermediate said exhaust port and said pressure supply passage, the differential area defined by said valve lands being subjected to said modulated pressure whereby a radially inward pressure force is established which opposes the outwardly directed centrifugal force acting on said spool valve element, a centrifugal weight movably mounted in said valve body, resilient means interconnecting said weight and said valve element, internal passage means formed in said valve body for subjecting said weight to said modulated pressure thereby establishing a radially outward fluid pressure force to supplement the centrifugal force acting on said weight, and means for anchoring said weight against said valve body when the radial displacement of said weight exceeds a predetermined value.

11. In a governor mechanism for establishing a fluid pressure signal functionally related in magnitude to the speed of rotation of a rotary member, a valve body connected to said rotary member, pressure modulating means for establishing a modulated pressure comprising a movable spool valve element disposed in said valve body, a pressure supply passage and an exhaust port formed in said valve body and communicating with said modulating means, said valve element having spaced valve lands formed thereon of differential diameter, a governor pressure passage communicating with said modulating means at a location intermediate said valve lands, one valve land providing a controlled degree of communication between said pressure supply passage and said governor pressure passage and the other valve land providing a controlled degree of communication between said exhaust port and said governor pressure passage, said governor pressure passage being located intermediate said exhaust port and said pressure supply passage, the differential area defined by said valve lands being subjected to said modulated pressure whereby a radially inward pressure force is established which opposes the outwardly directed centrifugal force acting on said spool valve element, a centrifugal weight movably mounted in said valve body, a compression spring interposed between said weight and said valve whereby the centrifugal force and the modulated pressure force acting on said weight are transferred to said valve element to modify the modulating characteristics of said valve element, internal passage means formed in said valve body for subjecting said weight to said modulated pressure thereby establishing a radially outward fluid pressure force to supplement the centrifugal force acting on said weight, and means for anchoring said weight against said valve body when the radial displacement of said weight exceeds a predetermined value whereby the influence of the modulated pressure force and the centrifugal force acting on said weight is overruled.

12. In a governor mechanism for establishing a fluid pressure signal functionally related in magnitude to the speed of rotation of a rotary member, a valve body connected to said rotary member, pressure modulating means for establishing a modulated pressure comprising a movable spool valve element disposed in said valve body, a pressure supply passage and an exhaust port formed in said valve body and communicating with said modulating means, said valve element having spaced valve lands formed thereon of differential diameter, a governor pressure passage communicating with said modulating means at a location intermediate said valve lands, one valve land providing a controlled degree of communication between said pressure supply passage and said governor pressure passage and the other valve land providing a controlled degree of communication between said exhaust port and said governor pressure passage, said governor pressure passage being located intermediate said exhaust port and said pressure supply passage, the differential area defined by said valve lands being sujected to said modulated pressure whereby a radially inward pressure force is established which opposes the outwardly directed centrifugal force acting on said spool valve element, a centrifugal weight movably mounted in said valve body, a compression spring interposed between said weight and said valve whereby the centrifugal force and the modulated pressure force acting on said weight are transferred to said valve element to modify the modulating characteristics of said valve element, internal passage means formed in said valve body for subjecting said weight to said modulated pressure thereby establishing a radially outward fluid pressure force to supplement the centrifugal force acting on said weight, means for anchoring said weight against said valve body when the radial displacement of said weight exceeds a predetermined value whereby the influence of the modulated pressure force and the centrifugal force acting on said weight are overruled, said valve element being positioned radially outward relative to said weight, and a stem formed on the radially inward end of said valve element, said spring being received over said stem, the latter forming a spring seat, said spring being precompressed between said seat and said valve element and having a low spring rate.

References Cited in the file of this patent

UNITED STATES PATENTS

| | | |
|---|---|---|
| 2,711,749 | Hettinger | June 28, 1955 |
| 2,738,650 | McAfee | Mar. 20, 1956 |
| 2,876,784 | Adams | Mar. 10, 1959 |
| 2,889,844 | McFarland | June 9, 1959 |
| 2,911,987 | Wayman | Nov. 10, 1959 |

FOREIGN PATENTS

| | | |
|---|---|---|
| 790,618 | Great Britain | Feb. 12, 1958 |